United States Patent

Levin et al.

(10) Patent No.: US 7,813,988 B2
(45) Date of Patent: Oct. 12, 2010

(54) METHOD AND SYSTEM FOR DETERMINING MARGIN REQUIREMENTS

(75) Inventors: Robert A. Levin, Short Hills, NJ (US); Benjamin M. Chesir, Woodmere, NY (US); Robert A. Biolsi, Bronx, NY (US)

(73) Assignee: New York Mercantile Exchange, Inc., New York, NY (US)

( * ) Notice: Subject to any disclaimer, the term of this patent is extended or adjusted under 35 U.S.C. 154(b) by 230 days.

(21) Appl. No.: 11/766,667

(22) Filed: Jun. 21, 2007

(65) Prior Publication Data

US 2008/0319920 A1 Dec. 25, 2008

(51) Int. Cl.
*G06Q 40/00* (2006.01)

(52) U.S. Cl. ........................ 705/36 R; 705/35
(58) Field of Classification Search .................. 705/37
See application file for complete search history.

(56) References Cited

U.S. PATENT DOCUMENTS

| | | |
|---|---|---|
| 2003/0009408 A1 | 1/2003 | Korin |
| 2004/0128222 A1* | 7/2004 | Turbeville et al. ............. 705/37 |
| 2006/0190383 A1 | 8/2006 | May |
| 2006/0277134 A1 | 12/2006 | Glinberg et al. |
| 2007/0118456 A1 | 5/2007 | Glinberg et al. |

* cited by examiner

*Primary Examiner*—James A Kramer
*Assistant Examiner*—James A Vezeris
(74) *Attorney, Agent, or Firm*—Banner & Witcoff, Ltd.

(57) ABSTRACT

The present invention provides for a system and method of applying value-at-risk determination of a financial portfolio to a performance bond requirement and comparing the value-at-risk determination with a traditional scenario-based performance bond requirement.

25 Claims, 4 Drawing Sheets

METHOD AND SYSTEM FOR DETERMINING MARGIN REQUIREMENTS

TECHNICAL FIELD

The present invention generally relates to a system and method for applying financial risk data to financial instruments. More particularly, the present invention relates to a system and method for applying the value-at-risk determination of a financial portfolio to a performance bond requirement.

BACKGROUND

Most futures commodity exchanges calculate performance bonds using a scenario based system such as the system developed by the Chicago Mercantile Exchange called Standard Portfolio Analysis of Risk™ (SPAN®). Since its implementation, SPAN has become the industry standard for establishing performance bond or margin requirements associated with a futures portfolio. As such, there has been little in development of value-at-risk determinations for performance bonds. As futures exchanges expand their product offerings to more complex and exotic products, such as for example, basis, calendar spread options, and average price options, the limitations of the SPAN system for margin requirements become more apparent.

Additionally, the tiered structure SPAN uses to apply credits may misrepresent risk. For example, if a customer has long and short outright futures positions intended to completely offset his short and long calendar swaps, SPAN will spread the futures first and the swaps second effectively producing two sets of spreads with performance bond requirements on both. The trader would expect the system to spread the long futures with the short calendar swaps and vice versa which would otherwise produce virtually no performance bond requirement. Moreover, the myriad of potential spreads and offsets is difficult if not impossible to cover while simultaneously margining in true risk terms with the SPAN system because of certain rigidity in the SPAN software that was initially developed for more traditional futures and options trading.

Accordingly there is a need in the art for an alternative performance bond or margining system that more accurately determines an exchange customer's risk exposure by accounting for all open positions in a portfolio, which accommodates the increasing number of exotic products traded on the exchange, and better allows for intra and inter commodity, calendar, and exchange positions.

The discussion of the background to the invention herein is included to explain the context of the invention. This is not to be taken as an admission that any of the material referred to was published, known, or part of the common general knowledge as at the priority date of any of the claims.

Throughout the description and claims of the specification the word "comprise" and variations thereof, such as "comprising" and "comprises", is not intended to exclude other additives, components, integers or steps.

SUMMARY

The present invention addresses a new method and system of establishing and assessing margin requirements. More specifically, the present invention provides an improved performance bond requirement or margining system that more accurately accounts for a portfolio's associated risk and overcomes the deficiencies of the SPAN-based system.

The present invention includes a method for accurately determining the risk associated with a portfolio using value-at-risk ("value-at-risk" or "VAR") methodologies and then using the VAR determination to establish a performance bond.

The present invention additionally includes a system and method for comparing the computed VAR-based margin requirement with the traditional SPAN-based margin requirement associated with a particular portfolio or a subset of a particular portfolio, and communicating the comparison of the two margin requirements with an exchange clearing member.

The present invention further includes a method and system for crediting or debiting a margin account with the difference between the VAR-based margin requirement and the traditional SPAN-based margin requirement.

An implementation of the present invention is directed to a method of determining margin requirements for a portfolio of positions on products traded on an exchange, the method comprising: identifying at least one open market position within the portfolio of all contracts within the portfolio that are cleared by or on behalf of the exchange; utilizing a VAR protocol to determine a clearing member's risk exposure associated with the at least one identified open market position; computing the a margin requirement for said the clearing member; and notifying the clearing member of the computed margin requirement.

An implementation of the present invention is further directed to a method of determining margin requirements for a portfolio of positions on products traded on an exchange, the method further comprising: receiving a request from a clearing member to determine a margin requirement based on VAR protocols for a portfolio of positions on products traded on an exchange, the portfolio associated with the clearing member.

An implementation of the present invention is still further directed to a method of determining margin requirements for a portfolio of positions on products traded on an exchange, the method further comprising receiving a request on behalf of a customer of the clearing member.

Another implementation of the present invention is directed to a method of determining margin requirements for a portfolio of positions on products traded on an exchange, the method further comprising: assessing the margin requirement to the clearing member in the form of a credit or debit.

An additional implementation of the present invention is directed to a method of determining margin requirements for a portfolio of positions on products traded on an exchange, the method further comprising: identifying all open market positions associated with a portfolio.

A further implementation of the present invention is directed to a method of determining margin requirements for a portfolio of positions on products traded on an exchange, wherein at least one open market position comprises at least one off-setting market positions.

Yet another implementation of the present invention is directed to a method of determining margin requirements for a portfolio of positions on products traded on an exchange, utilizing a VAR protocol based on a parametric model.

An additional implementation of the present invention is directed to a method of determining margin requirements for a portfolio of positions on products traded on an exchange, utilizing a VAR protocol based on a Monte Carlo simulation.

A further implementation of the present invention is directed to a method of determining margin requirements for a portfolio of positions on products traded on an exchange, utilizing a VAR protocol based on a historical simulation.

And another implementation of the present invention is directed to a method of determining margin requirements for a portfolio of positions on products traded on an exchange, wherein the margin requirement accounts for off-setting market positions.

An additional implementation of the present invention is directed to a method of determining margin requirements for a portfolio of positions on products traded on an exchange, wherein a debit or credit is applied to a margin account associated with the clearing member.

Another implementation of the present invention is directed to a method of determining margin requirements for a portfolio of positions on products traded on an exchange, wherein a debit or credit is applied to a SPAN-based margin requirement.

A further implementation of the present invention is directed to a method of determining margin requirements for a portfolio of positions on products traded on an exchange, the method comprising: calculating a SPAN-based margin requirement; comparing the SPAN-based margin requirement with a margin requirement computed from a risk exposure determined utilizing VAR protocols; obtaining a margin requirement variance; and notifying the clearing member of the margin requirement variance.

Still another implementation of the present invention is directed to a method of determining margin requirements for a portfolio of positions on products traded on an exchange, the method further comprising adjusting a SPAN-based margin requirement by a margin requirement variance.

An additional implementation of the present invention is directed to a method of determining margin requirements for a portfolio of positions on products traded on an exchange, the method further comprising: calculating a SPAN-based margin requirement wherein the risk exposure determined utilizing VAR protocols is a parameter to the SPAN-based margin requirement calculation.

A further implementation of the present invention is directed to a system for generating a VAR-based performance bond requirement, comprising: a selected position file indicating the open market positions associated with a selected trading portfolio; a VAR parameter generator operative to compute VAR variant files; and a VAR calculation module operative to receive the selected position file and the VAR variant files, to compute a VAR-based margin requirement, and generate a VAR-based margin report;

An additional implementation of the present invention is directed to a system for generating a VAR-based performance bond requirement, comprising a SPAN calculation module operative to receive a selected position file and a SPAN parameter file, to compute a SPAN-based margin requirement, and generate a SPAN-based margin report.

A further implementation of the present invention is directed to a system for generating a VAR-based performance bond requirement, comprising a comparison module being coupled with a VAR calculation module and a SPAN calculation module so as to access a VAR-based margin requirement and a SPAN-based margin requirement, and being operative to compare the VAR-based margin requirement with the SPAN-based margin requirement to compute a revised margin requirement.

Still a further implementation of the present invention is directed to a system for generating a VAR-based performance bond requirement, comprising a report processor operative to apply the difference between a VAR-based margin requirement and a SPAN-based margin requirement to an account associated with a selected portfolio in the form of a credit or debit.

Another implementation of the present invention is directed to a system for generating a VAR-based performance bond requirement, comprising a report processor operative to apply the difference between a VAR-based margin requirement and a SPAN-based margin requirement to a SPAN-based margin requirement in the form of a credit or debit.

And yet another implementation of the present invention is directed to a system for generating a VAR-based performance bond requirement, comprising a VAR parameter archiver being coupled to a VAR parameter generator and a VAR database, being further operative to categorize VAR parameters received from the VAR parameter generator and storing the VAR parameters in a VAR database.

As used herein, the term "SPAN based margin requirement," "SPAN based performance bond," and "SPAN based margin system" refers to margin requirements or performance bonds, and systems for calculating margin requirements or performance bonds, that utilize a scenario based calculation, such as for example, the CME SPAN system, or to performance bond systems that are based on or derived from a scenario based performance bond system.

DETAILED DESCRIPTION

Futures exchanges such as the New York Mercantile Exchange, Inc. (NYMEX) provide a marketplace where futures, and options on futures, are traded. Futures is a term used to designate all contracts covering the purchase and sale of financial instruments or physical commodities for future delivery on a commodity futures exchange. A futures contract is a legally binding agreement to buy or sell a commodity at a specified price at a predetermined future time. Each futures contract is standardized and specifies commodity, quality, quantity, delivery date and settlement. An option is the right, but not the obligation, to sell or buy the underlying instrument (in this case, a futures contract) at a specified price within a specified time. In particular, a put option is an option granting the right, but not the obligation, to sell a futures contract at the stated price prior to the expiration date. In contrast, a call option is an option contract which gives the buyer the right, but not the obligation, to purchase a specific futures contract at a fixed price (strike price) within a specified period of time as designated by the Exchange in its contract specifications. The buyer has the right to buy the commodity (underlying futures contract) or enter a long position, i.e. a position in which the trader has bought a futures contract that does not offset a previously established short position. A call writer (seller) has the obligation to sell the commodity (or enter a short position, i.e. the opposite of a long position) at a fixed price (strike price) during a certain fixed time when assigned to do so by the clearing organization. The term "short" refers to one who has sold a futures contract to establish a market position and who has not yet closed out this position through an offsetting procedure, i.e. the opposite of long. Generally, an offset refers to taking a second futures or options on futures position opposite to the initial or opening position, e.g. selling if one has bought, or buying if one has sold.

A futures exchange clearing organization, sometimes referred to as a clearing house, which may be a division of a futures exchange or an independent company that works in conjunction with a futures exchange, is responsible for settling trading accounts, clearing trades, collecting and maintaining performance bond funds, regulating delivery and reporting trading data. Clearing organizations also serve as guarantors, ensuring that the obligations of all trades are met, and thereby protecting buyers and sellers from financial loss that otherwise could arise in connection with potential default by a counterparty to any futures trade or contract.

Clearing organizations are carefully structured to provide futures exchanges with solid financial footing. A key component of this structure are deposits made to a clearing organization to ensure that traders meet the contractual obligations of the trades they make. These deposits are known as performance bonds or margin requirements.

Performance bonds or margin requirements are essentially good-faith deposits which can be used to cover adverse movements in futures prices. The futures exchange, acting through a clearing organization, must ensure that participants have sufficient funds to handle losses. In order to protect market participants and the integrity of the market, futures exchanges establish margin requirements at sufficiently high levels to adequately guard against the risks associated with changing market conditions. Futures exchanges establish specific margin requirements for the exchanges institutional customers, known as clearing members, and separate minimum margin requirements for customers of the clearing members, which may be calculated, for example, at 110% greater for member accounts and 135% greater for all other customers. As used herein, the term "clearing member" refers to any entity associated with a performance bond requirement, including, but not limited to traditional clearing members authorized to hold over night their own or their customers' positions on products traded, cleared or settled on an exchange, clearing organizations or houses authorized to clear positions on behalf of an exchange, or individual or institutional entities or members of an exchange holding or trading products on an exchange that are subject to a margin requirement.

The amount required for a performance bond varies according to the volatility of the product underlying the futures contract; the more volatility, the larger the performance bond. This is to ensure that the bond will cover maximum losses that a contract would likely incur in a single day. Performance bonds may be reduced where traders hold opposite positions in closely correlated markets or spread trades. For example, a trader taking a sell position, also known as a short position, in an S&P 500 product while simultaneously taking a buy position, also know as a long position, in a NASDAQ 100 product may qualify for a reduced spread margin. Similarly, a trader taking a long position in November Light Crude Oil and a short position in November Heating Oil may also qualify for a reduced spread margin.

Traders who establish a position, either long, short or some combination, need only maintain a certain amount of performance bond or margin in their trading account. The margin required is a percentage of the value of the contract, as determined each day, and usually, but not always, ranges between 5% and 15%. The percentage can range between 0% and 100%; 0% and 90%; 0% and 80%; 0% and 70%; 0% and 60%; 0% and 50%; 0% and 40%; 0% and 30%; 0% and 20%; or 0% and 10%. The percentage varies for each product according to the product's price and volatility. Futures traders don't exchange the full value of the underlying commodity—the "notional value"—of any futures contract. They need only ensure there is enough margin, or performance bond capital, in their account as they monitor the daily price changes of each contract they are trading. At the end of each day, and at some exchanges at periodic intervals during the trading day, the futures exchange identifies the current price for each contract or open position held by a trader and then debits or credits each trader's account according to that price.

Accounts that go under the amount of the deposit required must immediately add money to bring the account back up to the minimum, otherwise trading is not permitted on that account. Accounts that are unable to meet the minimum may be closed by the exchange.

Futures exchanges may require that the original margin on all futures and certain options be deposited by its institutional customers or clearing members on a gross basis for the clearing member's long and short customers. Accordingly, the exchange may then require that clearing members obtain initial margins from their customers. In addition to initial margin deposits, daily variation margin payments are made in cash to the exchange clearing organization by clearing members who have sustained losses on their futures positions. In turn, gains on futures positions are remitted to the appropriate clearing member. For the clearing member's customers, variation margin payments may be required by the clearing member if an adverse price movement erodes margin on deposit below the maintenance margin levels established by the exchange clearing organization.

The margining systems presently used by futures exchanges to calculate performance bond requirements are based on CME's SPAN system. Margin requirements established by SPAN are based on the overall risk of positions held by a clearing member in both the clearing member's house and customer accounts. SPAN then determines the overall risk of entire portfolios as calculated through options pricing models. SPAN-based margining requirements treat futures and options uniformly. The factors that affect option values in options pricing models include futures price, volatility, and time to expiration. As factors change, futures and options either gain or lose value. SPAN uses these factors to calculate the worst possible scenario and margins an entire portfolio on this basis. Futures exchanges then require member firms to collect from their customers' margins for open positions based on SPAN.

SPAN is a scenario analysis model that uses fixed software (integrated in clearing member back office books and records systems) and parameter files sent to all clearing members on a nightly basis that update the scenarios and data that the software uses. SPAN uses hard coded spread credits in the updates for inter and intra commodity spreads to determine: (1) the overall delta or risk exposure (aggregate position in a specific complex such as Henry Hub Gas recognizing that there are several different contracts that use Henry Hub Gas as its underlying commodity, such as American and European options, futures, and swaps) and (2) the credit or charge that is attributed to correlations or spreads such as Heat to Gas, Crude to Heat, Calendar spreads etc. Within this spread credit methodology SPAN also uses a tiered hierarchy to determine which products get spread with which other product and in which order to create credits or charges added to the risk in a particular product sector.

The SPAN system, however, has certain deficiencies with regard to intra- and inter-commodity spreads, inter-calendar spreads, and inter-exchange spreads. These deficiencies do not easily accommodate the increasing number of complex and relatively exotic products offered on an exchange trading floor and the associated electronic trading platform.

Span Process:

Futures exchanges establish minimum initial and maintenance performance bond levels for products traded through the exchanges facilities, including the trading floor and electronic trading systems. These performance bond requirements are typically based on historical price volatilities, current and anticipated market conditions, and other relevant information. Performance bond levels vary by product and are adjusted to reflect changes in price volatility and other factors. Both initial and maintenance performance bond levels represent the minimum amount of protection against potential losses at which an exchange will allow a clearing member to carry a position or portfolio. Should a clearing member's customer's performance bonds on deposit with the clearing member fall below the maintenance level, many exchanges require that the account be pre-margined at the required higher initial performance bond level. Clearing members may impose more stringent performance bond requirements than the minimums set by the exchanges. At the clearing organization level, clearing members must post at least the maintenance performance bonds for all positions carried by the clearing member, whether through the clearing members own institutional account or through its many customer accounts.

In setting performance bond levels, the clearing organization monitors current and historical price movements covering short, intermediate and longer-term data using statistical and parametric and non-parametric analysis. The clearing organization, and often the exchanges' directors or other officers typically set futures maintenance performance bond levels to cover at least the maximum one-day price move on 95% of the days during these time periods. The actual performance bond requirements often exceed this level. Performance bond requirements for options reflect movements in the underlying futures price, volatility, time to expiration and other risk factors, and adjust automatically each day to reflect the unique and changing risk characteristics of each option series. In addition, long options must be paid for in full, and exchanges typically require stringent minimum performance bonds for short option positions.

Most futures commodity exchanges calculate performance bonds with the SPAN system, which bases performance bond requirements on the overall risk of the portfolios using parameters determined by CME's Board of Governors. Prior to SPAN, performance bond requirements were typically determined using either "strategy-based" or "delta-based" systems. Delta methodology is based on the measure of the price-change relationship between an option and the underlying futures price and is equal to the change in premium divided by the change in futures price.

SPAN simulates the effects of changing market conditions and uses standard options pricing models to determine a portfolio's overall risk. SPAN treats futures and options uniformly. In standard options pricing models, three factors most strongly affect options values: the underlying futures price, volatility (variability of futures price) and time to expiration. As these factors change, options may gain or lose value. SPAN constructs scenarios of futures prices and volatility changes to simulate what the entire portfolio might reasonably lose over a one day time horizon. The resulting SPAN performance bond requirement covers this potential loss.

SPAN evaluates overall portfolio risk by calculating the worst probable loss that a portfolio might reasonably incur over a specified time period. SPAN achieves this number by comparing hypothetical gains and losses that a portfolio would sustain under different market conditions. SPAN typically provides a "Risk Array" analysis of 16 possible scenarios for a specific portfolio under various conditions. Each scenario consists of a "what if" situation in which SPAN assesses the effects of variations in price, volatility and time to expiration. Each calculation represents a gain or loss based on the possible gains or losses due to changes in an instrument's price by X and volatility by Y.

SPAN licensed clearing organizations and exchanges individually determine the following SPAN parameters, in order to reflect the risk coverage desired in any particular market: price scan range, volatility scan range, intra-commodity spread credit, short option minimum, spot charge, and inter-commodity spread credit. SPAN then combines financial instruments within the same underlying group for analysis, and refers to this grouping as the combined commodity group. For example, futures, options on futures and options on equities on the same stock could all be grouped under a single combined commodity.

To calculate a performance bond requirement, for each combined commodity in a portfolio, SPAN will: sum the scan risk charges, any intra-commodity spread and spot charge; apply the offsets for all inter-commodity spread credits within the portfolio; compare the above sum with any existing short option minimum requirement, and determine the greater of the two compared as the risk of the combined commodity.

The total margin requirement for a portfolio evaluated with the SPAN system is the sum of all combined commodities less all credit for risk offsets between the different combined commodities. United States Patent Application Pub. No. US 2006/0059607 A1, incorporated herein by reference, describes the specific algorithms and methodologies used in a SPAN-based performance bond system.

Span Deficiencies:

The current SPAN-based margin system has certain disadvantages when applied to modern exchange product slates available at many exchanges. The SPAN system was not intended to act as a risk management system for the complex, over-lapping product slates offered on many exchange trading floors and electronic trading systems. Indeed, there is a growing need to increase cross margining efficiencies between the exchange floor and the exchanges electronic trading system. Because of these certain deficiencies it is possible that the exchange clearing organization could be under-margined, facing risk beyond its operating parameters. In other situations, because of the deficiencies of SPAN to handle modern trading products, the clearing organization could be over-margined.

SPAN is limited in its ability to analyze the risk position for trading contracts with both inter-commodity and inter-calendar spreads. For example, assume a trader took a long position in both July Light Crude Oil (CLN) and August Brent Crude Oil (CSQ). Concurrently, the same trader took a short position in August Light Crude Oil (CLQ) and September Brent Crude Oil (CSU). Present SPAN methodology would spread CLN and CLQ together and also CSQ and CSU together, resulting in two inter-month spreads. The actual risk, however, entails both inter-month and inter-commodity spreads. While this particular long and short position may be accommodated by split allocation, those skilled in the art will appreciate that other more complex relationships would not be accommodated, for example, a situation in which a trader takes a long position January Heating Oil (HOF) and February Heating Oil (HOG) while at the same time taking a short position in March RBOB Gasoline (RBH) and April RBOB Gasoline (RBJ). SPAN methodology would create inter-month spreads but no inter-commodity spreads. What is needed is a comprehensive margin system that would spread each month of each commodity against every month of every commodity.

The ever increasing number of exotic options and trading products further illustrate the inefficiencies of the present SPAN-based margin system used in the industry. For example, the SPAN system currently uses the split allocation method for calendar spread and crack spread options on a delta basis. This approach effectively utilizes a delta-based margin system from the pre-SPAN era. Average price options are even more cumbersome and are considered by SPAN to be a different commodity than their associated more traditional options. Moreover, delta-based margining of spread options can be inefficient and often inaccurate.

Under SPAN, inter-commodity spread credits between commodities do not reference individual months. The credits are typically determined according to front month relationships (for example, the earlier months of a spread relationship). However, customers will get these credits regardless of which months are spread. For example, if a front month Heating Oil futures contract is spread against a back-month Crude Oil futures contract, the credit still applies, although in this instance it is probably unwarranted. A more efficient comprehensive margin system would take into account not only which commodities are being spread, but also which months within that commodity are being spread.

Additionally, futures contracts often have risk reduction characteristics when margined across more than one product. For example, Crude Oil may reduce the risk of an offsetting Heating Oil and Unleaded Gasoline position. A comprehensive margin system without the inter-calendar and inter-commodity limitations of a SPAN-based margin system would allow each position to hedge against the market risk of each other position.

VAR as a Risk Measure

Value-at-Risk (VAR) is a method for assessment of market-based financial risk in the trading of financial instruments which overcomes many of the limitations of the prior-art performance bond systems. Given a trading portfolio of financial instruments and a description of the market variance characteristics, a VAR analysis statistically determines how much of the value of the trading portfolio might be lost over a given period of time with a given level of probability. This determination is often expressed as the VAR measure. A more complete explanation of the VAR methodology can be found in *Return to RiskMetrics: The Evolution of a Standard*, RiskMetrics Group, Inc., April 2004, incorporated herein by reference.

VAR typically measures the market, or price risk of a portfolio of financial assets—that is, the risk that the market value of the portfolio will decline as a result of changes in interest rates, foreign exchange rates, equity prices, or commodity prices. VAR models aggregate the several components of price risk into a single quantitative measure of the potential for losses over a specified time horizon, conveying the market risk of an entire portfolio in one number. Moreover, VAR measures focus directly on loss of portfolio value, one of the major reasons for assessing risk.

Though there are many different models used in the art to arrive at a value-at-risk measure, the common categories of models include parametric models (including variance-covariance approaches using equally weighted moving averages and exponentially weighted moving averages, as well as Monte Carlo simulations for non-linear positions) and historical simulation approaches.

VAR models typically measure market risk by determining how much the value of a portfolio could decline over a given period of time with a given probability as a result of changes in market prices or rates. For example, if the given period of time is one day and the given probability is 1 percent, the VAR measure would be an estimate of the decline in the portfolio value that could occur with a 1 percent probability over the next trading day. Thus, if the VAR measure is accurate, losses greater than the VAR measure should occur less than 1 percent of the time.

Two important components of any VAR model are the length of time over which the market risk is to be measured and the confidence level at which market risk is measured. The choice of these components greatly affects the nature of the VAR model.

The time period used in the definition of value-at-risk, often referred to as the "holding period" is discretionary. VAR models assume that the portfolio's composition does not change over the holding period. This assumption argues for the use of short holding periods because the composition of active trading portfolios is apt to change frequently. One-day holding periods are typically used, though holding periods could be in fractional days or hours, or multiple days, weeks, months, or years.

Value-at-risk measures are most often expressed as percentiles corresponding to the desired confidence level. For example, an estimate of risk at the 99 percent confidence level is the amount of loss that a portfolio is expected to exceed only 1 percent of the time. It is also known as the $99^{th}$ percentile VAR measure because the amount is the $99^{th}$ percentile of the distribution of the potential losses of the portfolio. In practice, value-at-risk estimates are typically calculated from the $90^{th}$ to the $99.9^{th}$ percentiles, and most commonly from the $95^{th}$ to the $99^{th}$ percentile range.

Although many approaches may be applied when calculating portfolio VAR models, including parametric methods, Monte Carlo, and historical simulation methods, the use of past data is necessary to estimate potential changes in the value of the portfolio in the future. Using past data makes the assumption that the future will be like or similar to the past. Different VAR models, however, often define the past differently and make different assumptions about how markets will behave in the future.

Two parametric approaches to VAR modeling, the equally weighted moving average approach and the exponentially weighted moving average approach, are "variance-covariance" VAR models that assume normality and serial independence with an absence of non-linear positions such as options. Non-linear positions, however, may be accommodated with known simulation methods, such as Monte Carlo methods, and used in conjunction with variance-covariance matrices of the underlying market process or rates.

Variance-covariance approaches to VAR modeling are so named because they can be derived from the variance-covariance matrix of the relevant underlying market prices or rates. The variance-covariance matrix contains information on the volatility and correlation of all market prices or rates relevant to the portfolio. Knowledge of the variance-covariance matrix of these variables for a given period of time implies knowledge of the variance or standard deviation of the portfolio over the same period.

The dual assumption of normality and serial independence simplifies value-at-risk calculations because all percentiles are assumed to be known multiples of the standard deviation. Thus, the VAR calculation requires only an estimate of the standard deviation of the portfolio's change in value over the holding period. Also, serial independence means that the size of a price move on one day will not affect estimates of price moves on any other day. Therefore, longer horizon standard deviations can be obtained by multiplying daily horizon standard deviations by the square root of the number of days in the longer horizon. When the assumptions of normality and serial independence are made together, a single calculation of the portfolio's daily horizon standard deviation may be used to develop value-at-risk measures for any given holding period and any given percentile.

A VAR model may be based on a variance-covariance approach using an equally weighted moving average by calculating a given portfolio's variance (and thus, standard deviation) using a fixed amount of historical data. The portfolio variance is an equally weighted moving average of squared deviations from the mean. The fixed amount of historical data may include a relatively small number of recent days, for example, about seven or less days, about 14, 21, 28, 35, 42, or 49 or less days, or greater than 49 days, relying on the assumption that only very recent data is relevant to estimating potential movements in portfolio value. Or the fixed amount of historical data may include a large amount of data accumulated over numerous weeks, months or years, for example about six months or less, six months or more, one year or less, one to five years, or greater than five years. Utilizing large amounts of data may be preferred to estimate potential movements accurately.

The calculation of portfolio standard deviations using an equally weighted moving average approach is:

$$\sigma_t = \sqrt{\frac{1}{(k-1)} \sum_{s=t-k}^{t-1} (x_s - \mu)^2}.$$

where $\sigma_t$ denotes the estimated standard deviation of the portfolio at the beginning of day t. The parameter k specifies the number of days included in the moving average (the "observation period"). The parameter $x_s$ specifies the change in portfolio value on day s. And the parameter $\mu$ specifies the mean change in portfolio value, which may be assumed to be zero.

Exponentially weighted moving average approaches to variance-covariance based VAR models emphasize recent historical observations by using exponentially weighted moving averages of squared deviations. In contrast to equally weighted approaches, these approaches attach different weights to the past observations contained in the observation period. Because the weights decline exponentially, the most recent observations receive much more weight than earlier observations. The formula for the portfolio standard deviation under an exponentially weighted moving average approach is $$\sigma_t = \sqrt{(1-\lambda) \sum_{s=t-k}^{t-1} \lambda^{t-s-1} (x_s - \mu)^2}.$$

The parameter $\lambda$ referred to as the "decay factor," determines the rate at which the weights on past observations decay as they become more distant. In theory, for the weights to sum to one, these approaches should use an infinitely large number of observations k. The parameter $\mu$ is again preferably assumed to be zero.

Due to the normality and serial independence assumed in parametric approaches generally and in the variance-covariance approaches exemplified herein, the VAR measure may be expressed as a multiple of the standard deviation of a portfolio.

Figure 1:
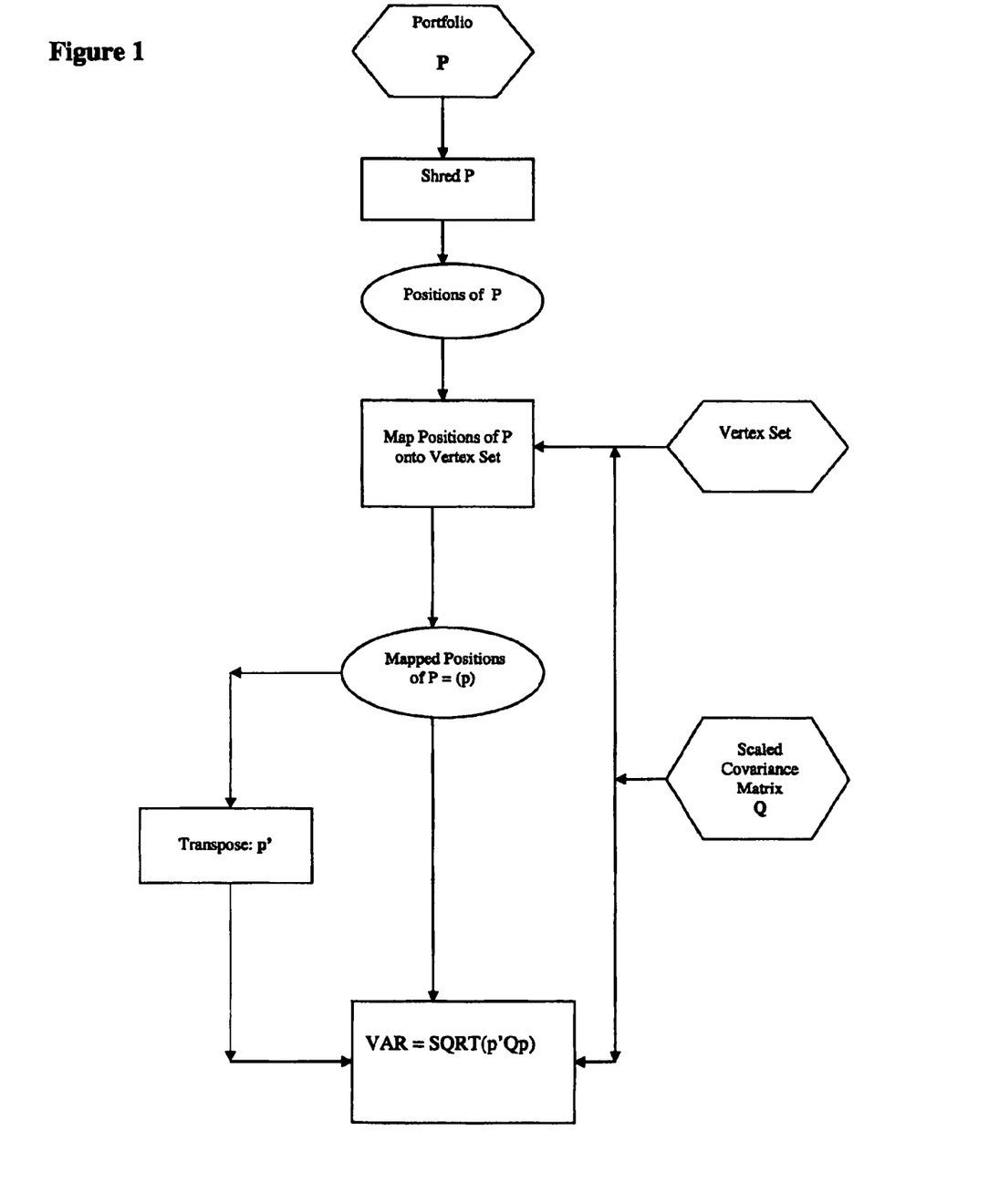
FIG. 1 depicts a data flow diagram of a prior-art system for determining the VAR measure of an existing trading portfolio.

U.S. Pat. Nos. 5,819,237 and 6,085,175, herein incorporated by reference, discuss prior-art systems for determining the VAR measure of a portfolio. FIG. 1 depicts a data flow diagram of an exemplary prior-art system for determining the VAR measure of an existing trading portfolio based off of a variance-covariance method. In such a conventional VAR system, a trading portfolio P of financial instruments is decomposed into a series of component asset flows or positions. This process is often referred to as "shredding," and produces a set of positions that approximates the current value and risk behavior of the portfolio. The positions are then mapped onto a set of specified, benchmark positions made at specified future time intervals from the present. The future time intervals are typically know as "tenors" and the combination of position type (e.g., crude oil, gold, U.S. Dollars, and the like) and a tenor is typically termed a "vertex." The mapping is useful in order to provide a representation of the portfolio as a standardized collection of positions. The vertices onto which the positions are mapped are those also used in a variance-covariance matrix Q of the market values of the benchmark positions. The covariance matrix Q describes the current market characteristics to a reasonable degree of detail. The shredding and mapping creates a set p of mapped positions from a portfolio P. These positions are then subjected to arithmetic operations with covariance matrix Q to produce the VAR measure.

For example, assume that the trading portfolio includes financial instruments maturing in arbitrary number of days from the present, such as 22 days. The covariance matrix Q typically includes only vertices for other maturation periods of the given financial instrument, such as at 7, 30 and 60 days from the present. In order to reliably determine the VAR measure in a conventional manner, the financial instrument is then mapped into selected position vertices, for example at either 7 or 30 days, or some distribution there between. There are a number of known mapping and shredding functions available to create the mapped set of positions p.

From the mapped positions, the VAR measure of the portfolio is determined by taking the square root of the product of the transpose p' of set of mapped asset flows p. The resulting VAR measure specifies how much money a trader might lose in the current trading portfolio over a given interval of time with a given probability.

For example, a financial instrument known as a "currency swap" may consist of the promise to pay certain amounts of Deutschemark in return for receiving certain amount of U.S. dollars, at certain times. Shredding reduces the currency swap into some set of positions, being, for example, negative in sign for the Deutschemark positions and positive in sign for the U.S. dollar positions. These shredded positions are each scheduled to occur at some assigned point in time in the future, as determined by the swap contract itself. To measure the market risk of the swap, the market risk of a benchmark set of positions is determined, for example, for $1 received (or paid) today, in one week, in one month, in 3 months, 6 months, 1 year, and so forth, and similarly for 1 DM received (or paid) at the same tenors. The risks are determined in part by the variances and covariances of all these quantities at the selected tenors, and in part by the amounts of such benchmark (vertex) positions. (Risks are measured only at benchmark tenors because measuring variances and covariances for all possible positions at all possible arbitrary tenors would be computationally impractical.) The shredded positions, however, do not necessarily lie exactly upon the vertices where the benchmark risks were measured. Therefore, the shredded positions are "mapped" onto the vertices in amounts that behave equivalently in terms of risk.

In the currency swap example, the set of shredded asset flows is mapped onto "equivalent-sized" asset flows lying at the vertices. Then the risk of all mapped asset flows is calculated together using the known VAR equation, accounting for the risk offsets of low covariance.

Alternatively, and instead of a variance-covariance based VAR model, there are numerous known historical simulation approaches to VAR models. Rather than using a specific quantity of past historical observations to calculate the portfolio's standard deviation, historical simulation approaches use the actual percentiles of the observation period as value-at-risk measures. For example, for an observation period of 500 days, the $99^{th}$ percentile historical simulation value-at-risk measure is the sixth largest loss observed in the sample of 500 outcomes (because the 1 percent of the sample that should exceed the risk measure equates to five losses.)

In a historical simulation approach, the $95^{th}$ and $99^{th}$ percentile VAR measures will not be constant multiples of each other. Moreover, value-at-risk measures for holding periods other than one day will not be fixed multiples of the one-day value-at-risk measures. Historical simulation approaches do not make the assumptions of normality or serial independence. However, relaxing these assumptions also implies that historical simulation approaches do not easily accommodate translations between multiple percentiles and holding periods.

Those skilled in the art will appreciate that there are numerous alternative approaches and models to determine the VAR value of a given portfolio, including Marginal VAR and Incremental VAR approaches. Marginal VAR determines the amount of risk that a particular position may add to a financial portfolio, or in another sense, how the VAR measure of a portfolio would change if a particular position were bought or sold. Marginal VAR can be formally defined as the difference between the VAR measure of the total portfolio and the VAR measure of the portfolio without the position of interest. Incremental VAR measures the effect of buying or selling a relatively small portion of a position within a portfolio on the overall risk of a financial portfolio. Incremental VAR is particularly useful when rebalancing a portfolio, such as selling off a portion of a position without liquidating the entire position.

VAR-Based Margining

Figure 2:
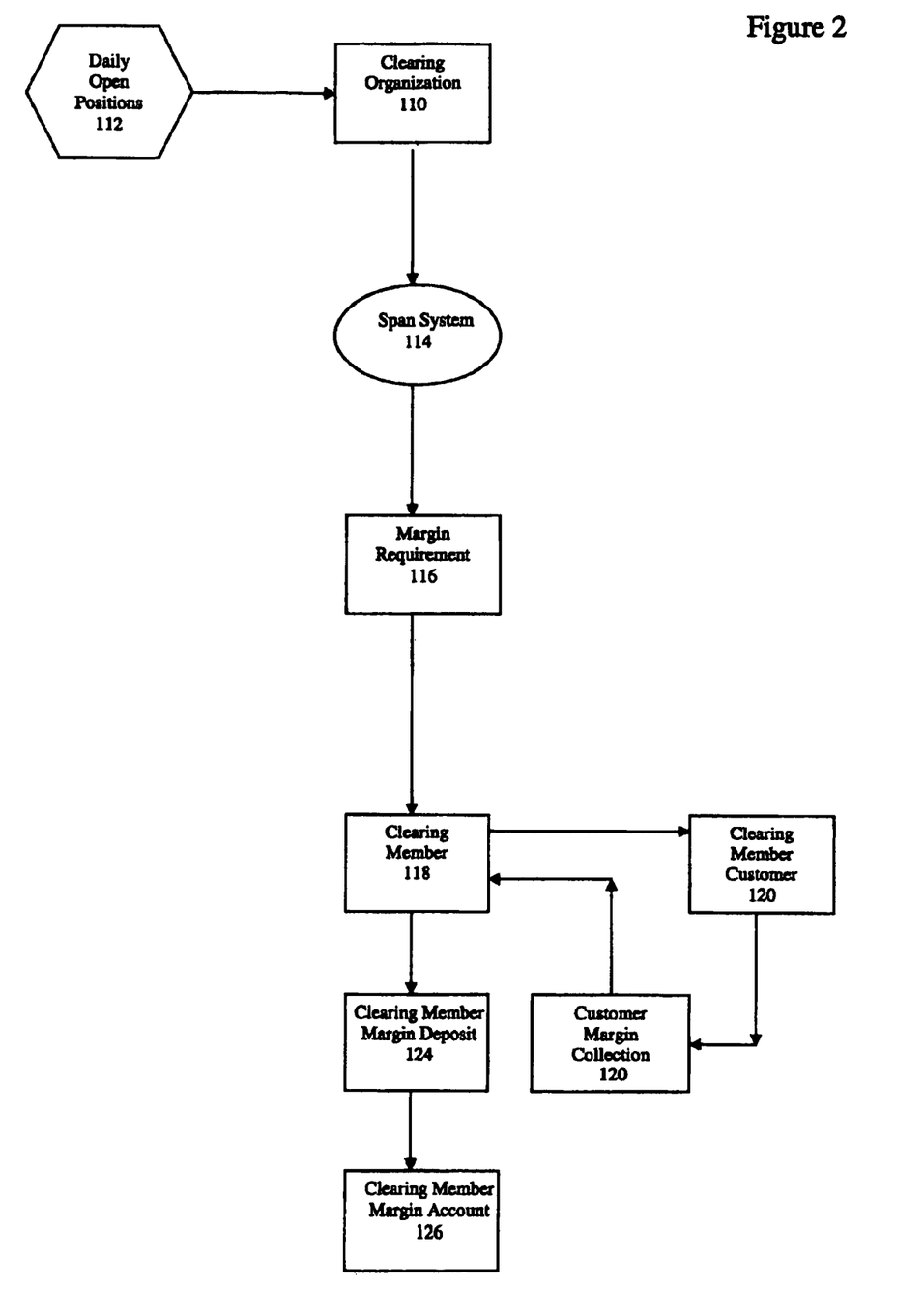
FIG. 2 depicts a flow chart of a prior-art SPAM-based margining system

To date VAR has not been used to establish performance bond requirements by an exchange clearing organization. FIG. 2 is a flow chart depicting a prior-art margining system 100 wherein the performance bond requirement is determined using SPAN. The exchange clearing organization 110 electronically receives the daily open positions 112 of a particular portfolio P, then using a SPAN-based system 114, the clearing organization 110 calculates the risk exposure associated with the open positions and assigns a performance bond or margin requirement 116 based on the risk exposure. The margin requirement 116 is transmitted to a clearing member 118 who in turn passes the margin requirement to the clearing member's customer 120. After receiving the margin collection 122 from its customer 120, the clearing member 118 deposits the clearing member margin deposit 124 into the clearing member margin account 126 with the exchange in order to meet the margin requirement 116.

Figure 3:
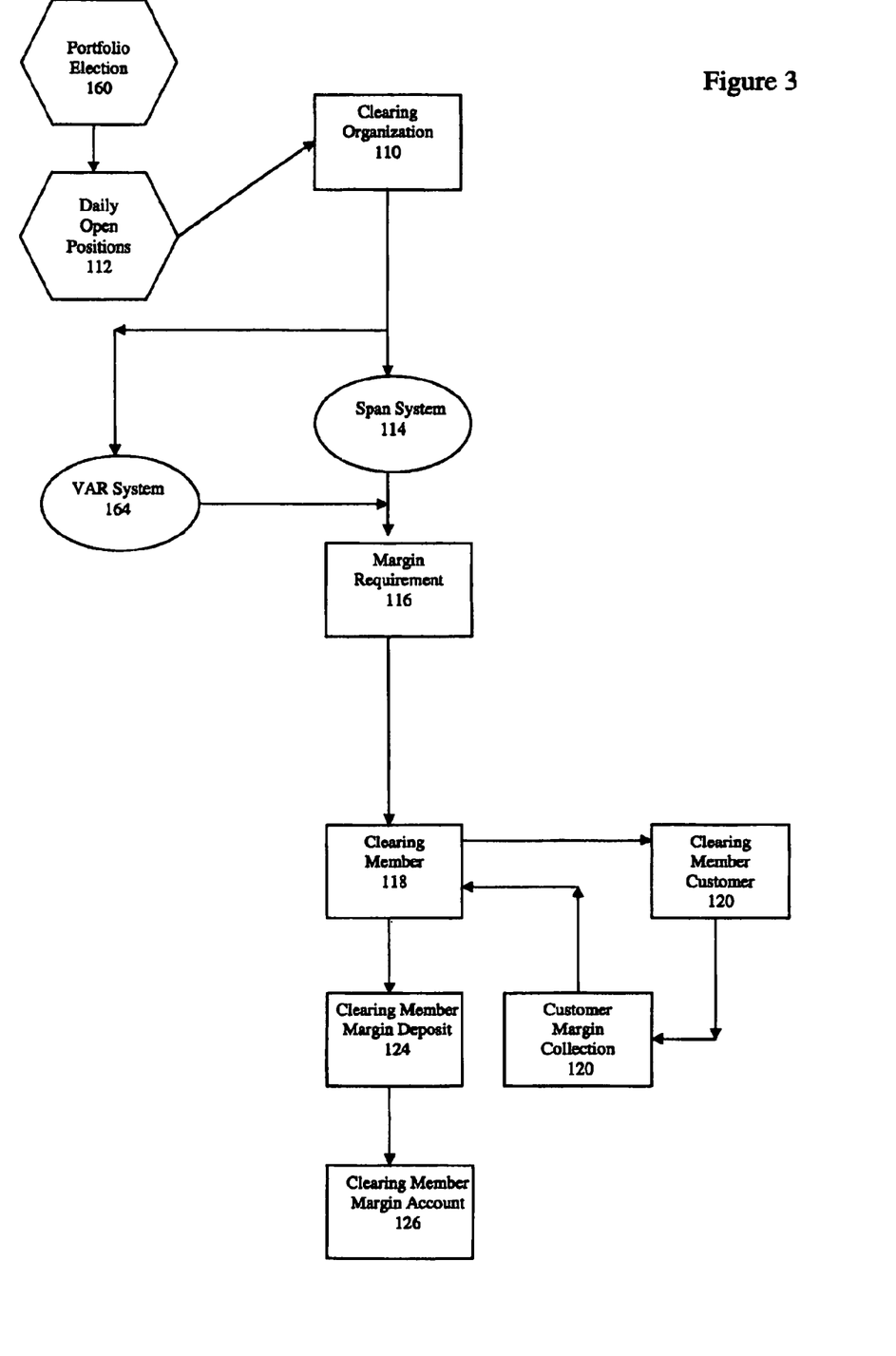
FIG. 3 depicts a flow chart of an embodiment of a VAR-based margining system, in accordance with the invention.

In an implementation of the present invention, the traditional SPAN-based margining process is augmented by an additional margining system based on VAR. Referring to FIG. 3, a clearing member makes an election or a request to include a particular portfolio in an exchange's VAR-based margining program. Alternatively, a clearing member's customer may elect or request to participate in an exchange's VAR-based margining program by making an election or requesting to include a particular portfolio of at least one or more positions in the VAR program, either directly to the clearing organization or through the clearing member. All open positions for a given time period, usually the end of a particular trading session, associated with the selected portfolio are entered into a VAR-based margin system 160 and a SPAN-based margin system 114 in order to create a margin report 116 which includes a VAR-based margin requirement, a SPAN-based margin requirement, and a comparison or delta of the VAR-based margin requirement and the SPAN-based margin requirement. In an implementation the VAR-based margin requirement may be input as an additional variable in the SPAN-based margin system.

The margin report may then be communicated to the clearing member together with the associated margin requirement. Typically, the clearing member will then pass along the margin requirement to the clearing member's customer, collect the necessary fees, and then deposit the margin with the clearing organization.

The ultimate margin requirement that the clearing member is required to post may be based entirely on the SPAN-based margin requirement. In this situation, the clearing member may use the delta between the SPAN-based margin requirement and the VAR-based margin requirement to lower the cash layout the clearing member may require from its customer. For example, if SPAN creates a margin requirement of $1000 while the VAR-based margin indicates that $200 more correctly accounts for the risk involved with a selected portfolio, then the clearing member could charge $200 dollars to its customer and loan the customer the remaining $800 plus interest to cover the margin requirement. The customer benefits because it does not have as large a cash requirement and the clearing member profits on the interest charged while having a firm understanding of the risk involved with the loan.

Alternatively, the clearing organization could determine the difference between the VAR-based margin requirement and the SPAN-based margin requirement and apply that difference in the form of a credit or debit to the either the SPAN-based margin requirement or the margin account associated with the selected portfolio on deposit with the clearing organization.

Figure 4:
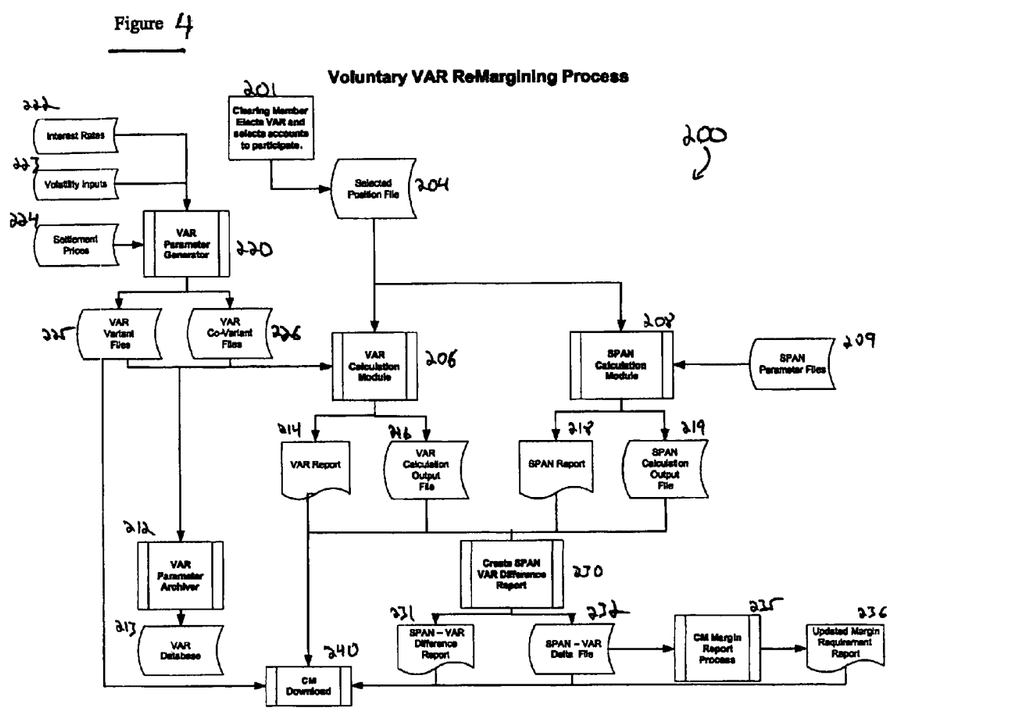
FIG. 4 depicts a flow chart of a system for VAR-based margining in accordance with the invention.

FIG. 4 illustrates an exemplary implementation of the invention and depicts a voluntary VAR-based re-margining process. First the clearing member selects an account portfolio 201 to participate in VAR. A position file 204 is generated indicating all open positions associated with the elected account portfolio 201 for a designated time period. Position file 204 is input into a SPAN calculation file 208 together with SPAN parameter files 209 and relevant real time market data 207. SPAN calculation module 208 then uses known SPAN methodologies to generate SPAN report 218 and SPAN calculation output file 219. SPAN report 218 and SPAN calculation output file 219 input into the clearing member download 240 which provides the clearing members a performance bond requirement based on SPAM methodologies.

At the same time that selected position file 204 is input into the SPAN calculation module 208, selected position file 204 is also input into VAR calculation module 206. Current or relevant interest rates 222, volatility inputs 223, and settlement prices 224 are input into VAR parameter generator 220, which generates VAR variant files 225 and VAR co-variant files 226 according to known VAR parameter methodologies.

VAR variant files 225 and VAR co-variant files 226, together with the selected position file 204, input into VAR calculation module 206 wherein VAR-based margin requirements are determined using known VAR methodologies to generate VAR report 214 and VAR calculation output file 216. VAR report 214 and VAR calculation file 216 are input into clearing member download 240.

VAR variant files 225 and VAR co-variant files 226 are also input into VAR parameter archiver 212, which categorizes variant files 225 and co-variant files 226 by parameters established by the exchange for cataloging into VAR historical database 213. VAR variant files 225 are also input into the clearing member download 240.

By this process, the clearing member receives, in clearing member download 240, performance bond requirements as reported in SPAN report 218 and VAR report 214, together with the supporting calculations for such performance bond requirements, as reported in SPAN calculation output file 219, and VAR calculation file 216. The clearing member is also provided with the relevant VAR variant files 225 supporting the VAR Report 206. By providing a VAR-based margin report in addition to the SPAN-based report, the exchange provides valuable risk management to the clearing member, which in turn may be offered as a service to the clearing members customers. By way of example, assuming that SPAN creates a margin requirement of $1000 while the VAR-based margin indicates that $200 more correctly accounts for the risk involved with a selected portfolio, the clearing member could charge $200 dollars to its customer and loan the customer the remaining $800 plus interest to cover the margin requirement. The customer benefits because it does not have as large a cash requirement and the clearing member profits on the interest charged while having a firm understanding of the risk involved with the loan.

The SPAN-VAR difference may also be provided as part of the Voluntary VAR re-margining process 200 described above. VAR report 214 and VAR calculation output file 216, together with SPAN report 218 and SPAN calculation output file 219, may also input into SPAN VAR difference report generator 230, which compares and calculates the variance between the two different performance bond requirements and generates SPAN-VAR difference report 231 and SPAN-VAR delta file 232.

SPAN-VAR difference report 231 may be included in the clearing member download 240. SPAN-VAR delta file 232 may also be included in the clearing member download 240 or may be input into clearing member margin report process 235 which generates an updated margin requirement to the clearing member through updated margin requirement report 236. The updated margin requirement accounts for the difference between the traditional SPAN-based margin requirement and the alternative VAR-based margin requirement. This difference could be applied to the clearing member's margin requirement in the form of either a credit or a debit to the clearing member's margin account held at the clearing organization. Alternatively, the SPAN-VAR difference could be applied to the outgoing margin requirement, thereby increasing or decreasing the performance bond required by the clearing organization.

The components described above may be implemented as one or more computer software/logic programs/modules stored in a memory or computer storage device and executable by a computer processor to implement the disclosed functionality and process. It will be appreciated that the components described above may include a computer system and network. Such a computer system should include a Pentium-class processor, or suitable equivalent, a hard disk drive with sufficient capacity, a memory with sufficient capacity, and a suitable output device such as a flat panel LCD display. Further the computer should execute an appropriate operating system, such as Microsoft Windows XP, published by the Microsoft Corporation, located in Redmond, Wash. The computer system may include a network interface being of a suitable type for the network, such as an Ethernet or optical based network. The network may be a public or private network, such as the Internet, an intranet, a virtual private network, or other TCP/IP or non TCP/IP based network, as is known in the art. Further, secure protocols, such as sHTTP or encryption, may be included to protect communication from being intercepted or modified and to generally authenticate users and ensure secure operation. It will be appreciated that any suitable computer system having suitable processing, storage and communications capability may be used with the disclosed embodiments, such as a mainframe computer, mini-computer, a workstation, a personal computer or a personal digital assistant. It will be further appreciated that the disclosed embodiments may be executed on a single computer system or one or more components may be executed on a computer system which is separate from one or more computer systems executing the remaining components, and suitably interconnected, such as via a network.

While the disclosed embodiments relate to a computer software program which is stored in the memory of a computer and executed by the processor(s) of the computer to perform the disclosed functions, it will be appreciated that one or more of the disclosed components may be implemented in hardware or a combination of hardware and software, and is implementation dependent.

What is claimed:

1. A computer implemented method of determining margin requirements for a portfolio of positions on products traded on an exchange, the method comprising:
   identifying, by a processor, at least one open market position within the portfolio of all contracts within the portfolio that are cleared by or on behalf of the exchange;
   utilizing a value-at-risk protocol to determine a clearing member's risk exposure associated with the at least one identified open market position, wherein the portfolio is associated with the clearing member;
   computing a first margin requirement for the clearing member based on the determined risk exposure;
   computing a second margin requirement based on the at least one open market position utilizing a scenario-based protocol;
   obtaining a margin requirement variance by comparing the second margin requirement with the first margin requirement; and
   notifying the clearing member of the first margin requirement and the margin requirement variance.

2. The method of claim 1 further comprising receiving a request from the clearing member to determine the first margin requirement.

3. The method of claim 2 wherein the request is on behalf of a customer of the clearing member.

4. The method of claim 1 further comprising assessing the first margin requirement to the clearing member in the form of a credit or debit.

5. The method of claim 1 wherein the step of identifying at least one open market position includes identifying all open market positions associated with the portfolio.

6. The method of claim 1 wherein the at least one open market position comprises off-setting market positions.

7. The method of claim 1 wherein the value-at-risk protocol uses a parametric model.

8. The method of claim 1 wherein the value-at-risk protocol uses a Monte Carlo simulation.

9. The method of claim 1 wherein the value-at-risk protocol uses a historical simulation.

10. The method of claim 1 wherein the first margin requirement accounts for off-setting market positions.

11. The method of claim 4 wherein the debit or credit is applied to a margin account associated with the clearing member.

12. The method of claim 4 wherein the debit or credit is applied to a second margin requirement.

13. The method of claim 1 further comprising adjusting the second margin requirement by the margin requirement variance.

14. The method of claim 1 wherein the risk exposure determined utilizing the value-at-risk protocol is a calculation parameter in the calculation of the second margin requirement.

15. The method of claim 1, further comprising assessing a charge to a margin account based on the first margin requirement.

16. The method of claim 1, further comprising initiating a loan for an amount of the margin requirement variance.

17. A computer readable medium comprising computer executable instructions that, when executed, cause a processor to perform a method comprising:
   identifying, by the processor, at least one open market position within a portfolio of all contracts within the portfolio that are cleared by or on behalf of an exchange;
   utilizing a value-at-risk protocol to determine a clearing member's risk exposure associated with the at least one identified open market position, at least part of the portfolio being managed by the clearing member, wherein the portfolio is associated with the clearing member;
   computing a first margin requirement for the clearing member based on the determined risk exposure;
   computing a second margin requirement based on the at least one open market position utilizing a scenario-based protocol;
   obtaining a margin requirement variance by comparing the second margin requirement with the first margin requirement; and
   notifying the clearing member of the first margin requirement and the margin requirement variance.

18. The computer readable medium of claim 17, wherein the computer executable instructions, when executed, cause the processor to apply the risk exposure determined utilizing the value-at-risk protocol as a calculation parameter in the computation of the second margin requirement.

19. The computer readable medium of claim 17, wherein the computer executable instructions, when executed, cause the processor to assess the first margin requirement to the clearing member in the form of a credit or debit.

20. The computer readable medium of claim 17, wherein the computer executable instructions, when executed, cause the processor to identify all open market positions associated with the portfolio.

21. The computer readable medium of claim 17, wherein the computer executable instructions, when executed, cause the processor to apply a debit or credit to a margin account associated with the clearing member.

22. The computer readable medium of claim 17, wherein the computer executable instructions, when executed, cause the processor to apply a debit or credit to the second margin requirement.

23. The computer readable medium of claim 17, wherein the computer executable instructions, when executed, cause the processor to adjust the second margin requirement by the margin requirement variance.

24. The computer readable medium of claim 17, wherein the computer executable instructions, when executed, cause the processor to assess a charge to a margin account based on the first margin requirement.

25. The computer readable medium of claim 17, wherein the computer executable instructions, when executed, cause the processor to initiate a loan for an amount of the margin requirement variance.

* * * * *